US007206412B2

(12) United States Patent
Yokota et al.

(10) Patent No.: US 7,206,412 B2
(45) Date of Patent: Apr. 17, 2007

(54) RECEPTION TERMINAL, KEY MANAGEMENT APPARATUS, AND KEY UPDATING METHOD FOR PUBLIC KEY CRYPTOSYSTEM

(75) Inventors: Kaoru Yokota, Ashiya (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 753 days.

(21) Appl. No.: 10/119,766

(22) Filed: Apr. 11, 2002

(65) Prior Publication Data

US 2002/0164035 A1 Nov. 7, 2002

(30) Foreign Application Priority Data

Apr. 12, 2001 (JP) .............................. 2001-113667

(51) Int. Cl.
*H04L 9/00* (2006.01)
(52) U.S. Cl. ..................... 380/278; 380/279; 380/282
(58) Field of Classification Search ................ 380/277, 380/278, 279, 280
See application file for complete search history.

(56) References Cited

U.S. PATENT DOCUMENTS

| 5,761,306 | A | * | 6/1998 | Lewis ......................... 380/282 |
| 5,825,300 | A | * | 10/1998 | Bathrick et al. ............. 340/5.74 |
| 6,038,322 | A | * | 3/2000 | Harkins ....................... 380/279 |
| 6,363,154 | B1 | * | 3/2002 | Peyravian et al. .......... 380/283 |
| 6,711,263 | B1 | * | 3/2004 | Nordenstam et al. ....... 380/282 |
| 6,985,589 | B2 | * | 1/2006 | Morley et al. .............. 380/269 |
| 6,996,720 | B1 | * | 2/2006 | DeMello et al. ............ 713/189 |

OTHER PUBLICATIONS

Menezes, Oorchot, Vanstone: "*Handbook of Applied Cryptography*", Handbook of Applied Cryptography, CRC Press Series on Discrete Mathematics and Its Applications, 1997, pp. 548-549, 551-553, 555, 556, 578-581, XP002259986.
Onufryk, P.Z. et al., "*Consumer Devices for Networked Audio*", Industrial Electronics, 1997. ISIE '97., Proceedings of the IEEE Intenrational Symposium on Guimaraes, Portugal Jul. 7-11, 1997, New York, NY, USA, IEEE, US, Jul. 7, 1997, pp. SS27-SS32, XP010265134.

* cited by examiner

*Primary Examiner*—Kambiz Zand
*Assistant Examiner*—Roderick Tolentino
(74) *Attorney, Agent, or Firm*—Wenderoth, Lind & Ponack, L.L.P.

(57) ABSTRACT

A method for use in a distribution system having a key management center, a distribution station and a reception terminal. The method updates a pair of distribution keys unique to the reception terminal, where the distribution public key is used to encrypt distribution data, and the distribution secret key is used to decrypt encrypted data. In the key updating method, the reception terminal acquires an update secret key prior to data distribution, and the key management center acquires an update public key making a pair with the update secret key, generates a new pair of distribution keys, encrypts a new distribution secret key by using the update public key, transmits an encrypted secret key to the reception terminal and updates to the new distribution public key. The reception terminal receives the encrypted secret key and restores the new distribution secret key by decrypting it using the update secret key and updates to the new distribution secret key.

17 Claims, 10 Drawing Sheets

RECEPTION TERMINAL, KEY MANAGEMENT APPARATUS, AND KEY UPDATING METHOD FOR PUBLIC KEY CRYPTOSYSTEM

BACKGROUND OF THE INVENTION (1) Field of the Invention

The present invention relates to a method of updating a key for use in a data distribution system adopting a public key cryptosystem.

(2) Description of the Related Art

So far, various cryptosystems have been developed to prevent unauthorized use of digital contents that are protected by copyright. In some cryptosystems, encrypted digital contents are distributed to users, and only authorized users have, in advance, a key for decrypting the encrypted digital contents.

In the above cryptosystems, unauthorized use of digital contents is prevented since only authorized users can decrypt the encrypted digital contents.

The cryptosystems are roughly divided into secret key cryptosystems and public key cryptosystems. These cryptosystems are described fully in "Modern Encryption Theory" written by Shin-ichi Ikeno & Kenji Koyama and published by the Institute of Electronics, Information and Communication Engineers (IEICE).

In the secret key cryptosystems, a distributor and the receivers own the same key in common secretly. The distributor encrypts digital contents by using the common key, and the receivers decrypt the encrypted digital contents by using the common key. Generally, one distributor has a plurality of receivers. As a result, distributors have a load of secretly managing as many keys as there are receivers.

In the public key cryptosystems, a distributor holds and uses public keys to encrypt digital contents, and receivers hold and use secret keys to decrypt the encrypted digital contents. In this system, the distributors have less load.

It is desirable for security reasons that the keys used for encryption and decryption are updated either regularly or on an as-needed basis.

To update a common key in a secret key cryptosystem, either the distributor or a receiver must generate a new common key and secretly transfer the key to the other. If the new common key is known to a third party with a malicious intention, the encrypted digital contents may be used by the third party. Therefore, strict measures should be taken to protect the key when it is transferred. As understood from this, the secret key cryptosystem is not suitable for uses that require frequent updating of keys.

To update a public key and a secret key in a public key cryptosystem, generally, each receiver generates a pair of a public key and a secret key and sends the public key to the distributor. The receiver holds the generated secret key without sending it to the distributor. With this arrangement, the secret key is not known to a third party, and even if the public key is known to a third party, it is impossible for the third party to decrypt the encrypted digital contents by using only the public key. As understood from this, the public key cryptosystem is suitable for uses that require frequent updating of keys since receivers can send public keys without taking security measures.

As described above, the public key cryptosystem is broadly used in the systems for distributing copyright-protected digital contents or the like since in this cryptosystem, the distributors do not need to manage keys secretly, and key updating is relatively easy.

However, in the distribution systems using the public key cryptosystem, it is desirable from the view point of comprehensive management that the updating of the keys in pairs is performed by the distributor, a key management center or the like rather than being performed by separate receivers at different times. It is also desired that the key pair updating is performed for all receivers at the same time to achieve an effective management of the public keys by the distributor, key management center or the like. However, it is difficult for conventional public key cryptosystems to achieve the above desired operations since, each receiver takes the initiative in updating keys in pairs in the conventional cryptosystems.

SUMMARY OF THE INVENTION

The object of the present invention is therefore to provide a method of updating pairs of keys conforming to a public key cryptosystem in a distribution system, where the method enables a distribution side and a key management center to take the initiative in updating the keys and to update a plurality of keys all at once.

The above object is fulfilled by a method, for use in a data distribution system having a key management center, a distribution station, and a reception terminal, for updating a pair of a distribution public key and a distribution secret key which conform to a public key cryptosystem and are both unique to the reception terminal, where the distribution public key is used to encrypt data to be distributed to the reception terminal, and the distribution secret key is used to decrypt the distributed encrypted data. The method comprises: an update secret key acquiring step in which the reception terminal acquires an update secret key prior to a data distribution; an update public key acquiring step in which the key management center acquires an update public key that makes a pair with the update secret key, prior to the data distribution; a key generating step in which the key management center generates a new pair of a distribution public key and a distribution secret key for the reception terminal; an encrypting step in which the key management center generates an encrypted secret key by encrypting the new distribution secret key by using the update public key; a transmission step in which the key management center transmits the encrypted secret key to the reception terminal; a distribution public key updating step in which, after the transmission step, the key management center updates the distribution public key having been used so far by the distribution station in data distributions to the new distribution public key; a reception step in which the reception terminal receives the encrypted secret key; and a distribution secret key updating step in which the reception terminal restores the new distribution secret key as necessary by decrypting the encrypted secret key by using the update secret key, and updates the distribution secret key having been used so far to the restored new distribution secret key.

With the above-described construction, the key management center generates the distribution public key and the distribution secret key, encrypts the distribution secret key by using the update public key, and transmits the encrypted secret key. This enables the key management center to take the initiative in updating the pair of distribution keys so as to assure a safe distribution of the keys.

In the above key updating method, in the encrypting step, the key management center may further place a digital signature on the encrypted secret key as a certification of the encrypted secret key, and in the distribution secret key updating step, the reception terminal checks the digital signature placed on the encrypted secret key and judges whether the encrypted secret key has the certification of the encrypted secret key. The reception terminal updates to the new distribution secret key if having judged positively and does not update if having judged negatively.

With the above-described construction, it is possible to place a digital signature onto the encrypted secret key as a certification of the encrypted secret key. This prevents the distribution secret key from being updated erroneously.

In the above key updating method, the data distribution system may have a plurality of reception terminals, a plurality of pairs of a distribution public key, and a distribution secret key is prepared for each of the plurality of reception terminals, respectively and uniquely. Each distribution public key is used to encrypt data to be distributed to a corresponding reception terminal, and each distribution secret key is used by a corresponding reception terminal to decrypt distributed encrypted data. Further, in the update secret key acquiring step, each reception terminal acquires a corresponding update secret key. In the update public key acquiring step, the key management center acquires a plurality of update public keys that make pairs with the plurality of update secret keys, respectively. In the key generating step, the key management center generates a plurality of new pairs of a distribution public key and a distribution secret key, where each new pair is unique to a different one of the plurality of reception terminals. In the encrypting step, the key management center generates encrypted secret keys for the plurality of reception terminals by encrypting the new distribution secret keys by using the update public keys for the plurality of reception terminals, respectively. In the transmission step, the key management center transmits the encrypted secret keys to the corresponding reception terminals all at once. In the distribution public key updating step, after the transmission step, the key management center updates the distribution public keys for the plurality of reception terminals having been used so far by the distribution station in data distributions to the new distribution public keys. In the reception step, each reception terminal receives a corresponding encrypted secret key. In the distribution secret key updating step, each reception terminal restores the corresponding new distribution secret key as necessary by decrypting the corresponding encrypted secret key by using the corresponding update secret key, and updates the distribution secret key having been used so far to the restored new distribution secret key.

With the above-described construction, it is possible to update pairs of distribution keys all at once.

The above key updating method may further comprise: a terminal detecting step in which the distribution station detects a reception terminal for which data distribution should be stopped; and a distribution preventing step in which, when a reception terminal for which data distribution should be stopped is detected in the terminal detecting step, the distribution station prevents data distribution to the detected reception terminal.

With the above-described construction, the key management center can take the initiative in preventing distribution of encrypted data to part (one or more) of the reception terminals.

The above key updating method may further comprise a terminal detecting step in which the distribution station detects a reception terminal for which a distribution secret key should be updated. In the key generating step, the key management center generates a new pair of a distribution public key and a distribution secret key for the reception terminal detected in the terminal detecting step. In the encrypting step, the key management center generates an encrypted secret key for the detected reception terminal by encrypting the new distribution secret key generated for the detected reception terminal, by using the update public key unique to the detected reception terminal. In the transmission step, the key management center transmits the encrypted secret key for the detected reception terminal to the detected reception terminal. In the distribution public key updating step, after the transmission step, the key management center updates the distribution public key having been used so far by the distribution station in data distributions to the detected reception terminal, to the new distribution public key. In the distribution secret key updating step, the detected reception terminal restores the new distribution secret key as necessary by decrypting the encrypted secret key by using the update secret key, and updates the distribution secret key having been used so far to the restored new distribution secret key.

With the above-described construction, the key management center can take the initiative in updating the distribution secret key for one or more of the reception terminals.

In the above key updating method, the distribution station may generate encrypted contents keys respectively corresponding to the plurality of reception terminals by encrypting a contents key conforming to a secret key cryptosystem by using the distribution public keys respectively corresponding to the plurality of reception terminals, generate encrypted contents respectively corresponding to the plurality of reception terminals by encrypting a content by using the corresponding contents keys, and distribute (a) all the generated encrypted contents keys and (b) a corresponding encrypted content to each of the plurality of reception terminals. Further, each reception terminal restores each contents key by decrypting each encrypted contents key among the distributed encrypted contents keys by using each distribution secret key for each reception terminal, and restores the content by decrypting each corresponding encrypted content by using each restored contents key.

With the above-described construction, the distribution station distributes to each reception terminal (a) all the encrypted contents keys for the reception terminals generated by encrypting the content key by using the distribution secret keys for the reception terminals, and (b) an encrypted content generated by encrypting a content using the content key. This reduces the total amount of distributed data, and reduces the load on each apparatus in decrypting the content.

In the above key updating method, the reception terminal may have an IC card on which an encrypted secret key which is unique to the reception terminal is recorded. The reception terminal restores a distribution secret key by decrypting the encrypted secret key recorded on the IC card, and decrypts distributed encrypted data by using the restored distribution secret key. In the transmission step, the key management center records the encrypted secret key generated in the encrypting step onto a new IC card, and transmits the new IC card to the reception terminal. In the reception step, the reception terminal receives the new IC card, and in the distribution secret key updating step, the reception terminal updates to the new distribution secret key by replacing the IC card having been used so far with the new IC card.

With the above-described construction, the distribution secret key is updated to the new distribution secret key by replacing the IC card with the new IC card. This increases the level of security, as compared with the case where the new encrypted secret key is transferred by using a public telephone line or the like.

The above object is also fulfilled by a reception terminal for restoring certain data by decrypting encrypted certain data distributed from a distribution station, by using a distribution secret key which is unique to the reception terminal. The reception terminal comprises: an update secret key acquiring means (unit) for acquiring an update secret key prior to a data distribution; a holding means (unit) for holding an encrypted secret key which is generated by encrypting the distribution secret key by using an update public key that makes a pair with the update secret key; a reception means (unit) for receiving the encrypted data from the distribution station; a distribution secret key restoring means (unit) for restoring the distribution secret key which is unique to the reception terminal by decrypting the encrypted secret key held by the holding means, by using the update secret key acquired by the update secret key acquiring means; and a data restoring means (unit) for restoring the certain data by decrypting the encrypted certain data by using the restored distribution secret key.

With the above-described construction, it is possible to generate a distribution secret key by decrypting the encrypted secret key that is being held by using an acquired update secret key, and obtain the certain data by decrypting the received encrypted data by using the generated distribution secret key. This enables a system other than the reception terminals to update the distribution secret key in so far as each reception terminal can acquire the update secret key secretly, thereby enabling a system other than the reception terminals to take the initiative in updating the pairs of distribution keys so as to assure a safe distribution of the keys.

The above reception terminal may further comprise: a new key receiving means (unit) for receiving a new encrypted secret key from the key management center, where the new encrypted secret key is generated by the key management center by encrypting a distribution secret key by using the update public key, the distribution secret key makes a pair with a distribution public key, the pair is generated by the key management center and conforms to a public key cryptosystem; and a secret key updating means (unit) for updating the encrypted secret key held by the holding means to the new encrypted secret key.

With the above-described construction, the key management center generates the distribution public key and the distribution secret key, encrypts the distribution secret key by using the update public key, and transmits the new encrypted secret key. This enables the reception terminal to receive the new encrypted secret key and updates the encrypted secret key having been used so far to the new encrypted secret key. This enables the key management center to take the initiative in updating the pair of distribution keys so as to assure a safe distribution of the keys.

In the above reception terminal, the new encrypted secret key received by the new key receiving means may have a digital signature as a certification of the new encrypted secret key. After the secret key updating means updates to the new encrypted secret key, the distribution secret key restoring means checks the digital signature placed on the new encrypted secret key and judges whether the new encrypted secret key has the certification of the new encrypted secret key, and restores another distribution secret key by decrypting the new encrypted secret key if having judged positively and does not restore another distribution secret key if having judged negatively.

With the above-described construction, it is possible to judge whether or not the held encrypted secret key has a certification by checking the digital signature placed on the encrypted secret key. This prevents the distribution secret key from being used erroneously.

In the above reception terminal, the reception means may receive (a) an encrypted contents key generated by encrypting a contents key by using the distribution public key unique to the reception terminal, and (b) an encrypted content generated by encrypting a content by using the contents key. Further, data restoring means may restore the contents key by decrypting the encrypted contents key by using the distribution secret key unique to the reception terminal, and restore the content by decrypting the encrypted content by using the restored contents key.

With the above-described construction, the distribution station distributes to each reception terminal (a) all the encrypted contents keys for the reception terminals which are generated by encrypting the content key by using the distribution secret keys for the reception terminals, and (b) an encrypted content which is generated by encrypting a content by using the content key. This reduces the total amount of distributed data, and reduces the load on each apparatus in decrypting the content.

In the above reception terminal, the holding means may be an IC card, the new key receiving means receives a new IC card on which the new encrypted secret key is recorded, and the secret key updating means updates to the new encrypted secret key by replacing the IC card having been used so far with the new IC card.

With the above-described construction, the distribution secret key is updated to the new distribution secret key by replacing the IC card with the new IC card. This increases the level of security, as compared with the case where the new encrypted secret key is transferred by using a public telephone line or the like.

The above object is also fulfilled by a key management apparatus comprising: an update public key acquiring means (unit) for acquiring, prior to a data distribution, an update public key that makes a pair with an update secret key held by a reception terminal; a key generating means (unit) for generating a pair of a distribution public key and a distribution secret key for the reception terminal; an encrypting means (unit) for generating an encrypted secret key by encrypting the distribution secret key by using the update public key; a transmission means (unit) for transmitting the encrypted secret key to the reception terminal; a distribution public key updating means (unit) for, after the encrypted secret key is transmitted to the reception terminal, updating the distribution public key having been used so far to the new distribution public key for use in data distribution.

With the above-described construction, the key management apparatus generates the distribution public key and the distribution secret key, encrypts the distribution secret key by using the update public key, and transmits the encrypted secret key. This enables the key management apparatus to take the initiative in updating the pair of distribution keys so as to assure a safe distribution of the keys.

In the above key management apparatus, the encrypting means may further place a digital signature on the encrypted secret key as a certification of the encrypted secret key.

With the above-described construction, the key management apparatus places a digital signature onto the encrypted secret key. This enables the reception terminal to judge whether or not the received encrypted secret key has a certification, thus preventing the reception terminal from erroneously updating to an unauthenticated distribution secret key.

In the above key management apparatus, the update public key acquiring means may acquire a plurality of update public keys that are respectively unique to a plurality of reception terminals, and the key generating means generates a plurality of pairs of a distribution public key and a distribution secret key, where each pair is unique to a different one of the plurality of reception terminals. In addition, encrypting means generates encrypted secret keys for the plurality of reception terminals by encrypting the distribution secret keys by using the update public keys for the plurality of reception terminals, respectively, and the transmission means transmits the encrypted secret keys to the corresponding reception terminals all at once. Further, the distribution public key updating means, after the transmission of the encrypted secret keys, updates the distribution public keys having been used so far to the new distribution public keys for the respective reception terminals.

With the above-described construction, it is possible to update pairs of distribution keys all at once.

The above key management apparatus may further comprise a terminal detecting means (unit) for detecting a reception terminal for which data distribution should be stopped, and a distribution preventing means (unit) for, when a reception terminal for which a data distribution should be stopped is detected by the terminal detecting means, preventing the data distribution to the detected reception terminal.

With the above-described construction, the key management apparatus can take the initiative in preventing distribution of encrypted data to one or more of the reception terminals.

The above key management apparatus may further comprise a terminal detecting means (unit) for detecting a reception terminal for which a distribution secret key should be updated. The key generating means generates a new pair of a distribution public key and a distribution secret key for the reception terminal detected by the terminal detecting means, and the encrypting means generates an encrypted secret key for the detected reception terminal by encrypting the new distribution secret key generated for the detected reception terminal, by using the update public key unique to the detected reception terminal. Further, the transmission means transmits the encrypted secret key for the detected reception terminal to the detected reception terminal, and the distribution public key updating means, after the transmission of the encrypted secret key, updates the distribution public key having been used so far to the new distribution public key, for the detected reception terminal.

With the above-described construction, the key management apparatus can take the initiative in updating the distribution secret key for part (one or more) of the reception terminals.

In the above key management apparatus, the key management apparatus may also serve as a distribution station and further comprise: a distribution data generating means (unit) for generating a plurality of pieces of encrypted data respectively for the plurality of reception terminals by encrypting certain data by using distribution public keys for the plurality of reception terminals; and a distribution means (unit) for distributing all the plurality of pieces of encrypted data to each of the plurality of reception terminals.

With the above-described construction, the distribution station can update pairs of distribution keys all at once.

In the above key management apparatus, the distribution data generating means may generate a plurality of pieces of encrypted contents keys respectively for the plurality of reception terminals by encrypting a contents key by using the distribution public keys for the plurality of reception terminals. The distribution data generating means generates encrypted contents respectively corresponding to the plurality of reception terminals by encrypting a content by using the corresponding contents keys, and the distribution means distributes (a) all the generated encrypted contents keys, and (b) a corresponding encrypted content to each of the plurality of reception terminals.

With the above-described construction, the distribution station distributes to each reception terminal (a) all the encrypted contents keys for the reception terminals generated by encrypting the content key by using the distribution secret keys for the reception terminals, and (b) an encrypted content generated by encrypting a content using the content key. This reduces the total amount of distributed data, and reduces the load on each apparatus in decrypting the content.

In the above key management apparatus, the reception terminal may have an IC card on which an encrypted secret key that is unique to the reception terminal is recorded. The reception terminal restores a distribution secret key by decrypting the encrypted secret key recorded on the IC card, and decrypts distributed encrypted data by using the restored distribution secret key. The transmission means records the encrypted secret key generated by the encrypting means onto a new IC card, and transmits the new IC card to the reception terminal.

With the above-described construction, a new IC card on which a new encrypted secret key is recorded is sent to each reception terminal, and each reception terminal updates to a new distribution secret key by replacing the IC card having been used so far with the new IC card. This increases the level of security, as compared with the case where the new encrypted secret key is transferred by using a public telephone line or the like.

BRIEF DESCRIPTION OF THE DRAWINGS

These and the other objects, advantages and features of the present invention will become more apparent from the following detailed description when taken in conjunction with the accompanying drawings which illustrate specific embodiments of the present invention.

In the drawings.

DETAILED DESCRIPTION OF THE PREFERRED EMBODIMENTS

First Embodiment

Summary

The first embodiment of the present invention explains a technique for use in a contents distribution system having one key management center, one distribution station, and a plurality of reception terminals. In the contents distribution system, the key management center takes the initiative in updating a pair of a public key and a secret key for each reception terminal in a public key cryptosystem.

Prior to a contents distribution, each reception terminal generates a pair of an update secret key and an update public key, secretly holds the update secret key and sends the update public key to the key management center.

The key management center, holding the update public keys previously sent from the respective reception terminals, generates a pair of a distribution secret key and a distribution public key for each reception terminal at the initial distribution of contents or each updating of keys. The distribution station uses the distribution public key when it distributes the contents. The key management center generates an encrypted secret key by encrypting the generated distribution secret key by using the update public key, and sends the encrypted secret keys to each reception terminal.

Upon receiving an encrypted secret key, each reception terminal generates a distribution secret key by decrypting the received encrypted secret key by using the update secret key it holds, and uses the distribution secret key to decrypt a received content.

As described above, the first embodiment provides a technique in which a distribution secret key is encrypted by using an update public key and the generated encrypted secret key is sent to each reception terminal. This technique enables the safe distribution of secret keys and allows the key management center to take the initiative in updating the pairs of public and secret keys for the reception terminals.

Construction

Figure 1:
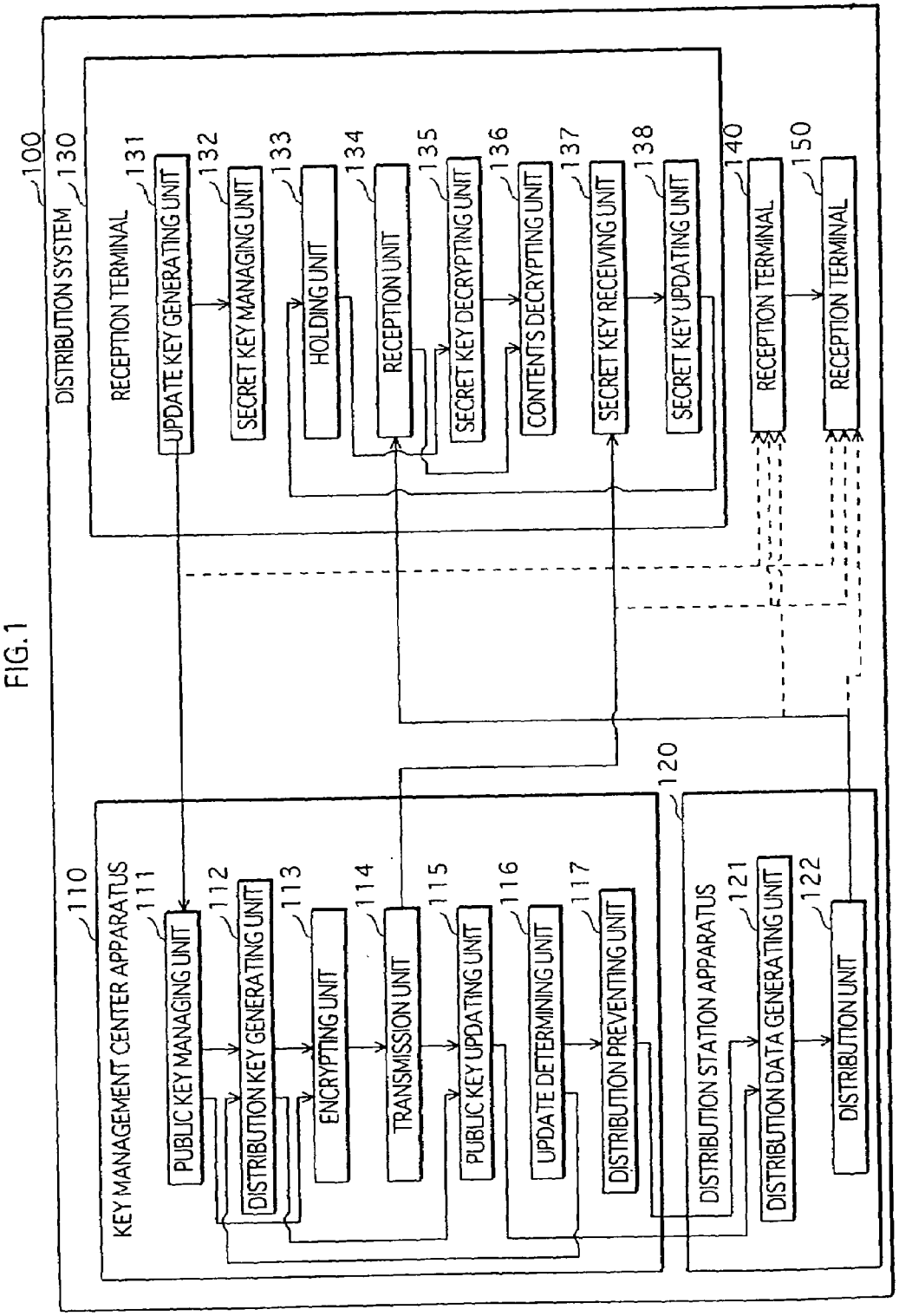
FIG. 1 shows the distribution system according to a first embodiment of the present invention.

FIG. 1 shows the distribution system according to the first embodiment of the present invention.

The distribution system 100 shown in FIG. 1 includes a key management center apparatus 110, a distribution station apparatus 120, and reception terminals 130, 140, and 150.

The key management center apparatus 110 manages the same keys that are respectively held by all the reception terminals included in the distribution system 100. The key management center apparatus 110 includes a public key managing unit 111, a distribution key generating unit 112, an encrypting unit 113, a transmission unit 114, a public key updating unit 115, an update determining unit 116, and a distribution preventing unit 117.

The distribution station apparatus 120 generates and distributes data to each reception terminal, and includes a distribution data generating unit 121 and a distribution unit 122.

The reception terminal 130 receives the data from the distribution station apparatus 120 and reproduces contents of the received data for the user. The reception terminal 130 includes an update key generating unit 131, a secret key managing unit 132, a holding unit 133, a reception unit 134, a secret key decrypting unit 135, a contents decrypting unit 136, a secret key receiving unit 137, and a secret key updating unit 138.

The reception terminals 140 and 150 have similar constructions as the reception terminal 130, and the explanation thereof is omitted here.

The public key managing unit 111 receives from each reception terminal an update public key which is respectively unique to each reception terminal, prior to a data distribution.

The distribution key generating unit 112, when updating a key or before a data distribution, generates for each reception terminal a pair of a distribution public key and a distribution secret key, each of which is unique to the reception terminal and conforms to a public key cryptosystem.

It is supposed herein that the ElGamal cryptosystem is used as the public key cryptosystem. For the ElGamal cryptosystem, refer to "Modern Encryption Theory" written by Shin-ichi Ikeno & Kenji Koyama and published by the Institute of Electronics, Information and Communication Engineers (IEICE).

The encrypting unit 113 generates an encrypted secret key for each reception terminal by encrypting the distribution secret key generated by the distribution key generating unit 112 by using the update public key managed by the public key managing unit 111. The encrypting unit 113 also places a digital signature for certification of the key management center apparatus 110 as the generator of the encrypted secret key.

It is supposed herein that the digital signatures conform to the ElGamal cryptosystem. For the digital signatures conforming to the ElGamal cryptosystem, refer to "Modern Encryption Theory" having been introduced earlier.

The transmission unit 114, when updating a key or before a data distribution, transmits the encrypted secret key generated by the encrypting unit 113 to each reception terminal.

The public key updating unit 115, after the transmission unit 114 transmits the encrypted secret key to each reception terminal, instructs the distribution station apparatus 120 to use, when distributing data to each reception terminal, the distribution public keys generated by the distribution key generating unit 112.

The update determining unit 116 monitors the operation of each reception terminal to detect a reception terminal for which data distribution should be stopped or for which the distribution secret key should be updated. For example, the update determining unit 116 may determine that all distribution secret keys should be updated either when any reception terminals are abnormally operating or on a regular basis.

It should be noted here that every distribution secret key that is determined to be updated by the update determining unit 116 is updated without delay by the distribution key generating unit 112, encrypting unit 113, transmission unit 114, and public key updating unit 115.

The distribution preventing unit 117, when the update determining unit 116 has detected a reception terminal for which a data distribution should be stopped, prevents the data distribution to the detected reception terminal in which the distribution public key is used.

The distribution data generating unit 121 generates encrypted contents keys for each reception terminal by encrypting a contents key conforming to the secret key cryptosystem, by using each distribution public key for each reception terminal. The distribution data generating unit 121 also generates an encrypted content by encrypting a content to be distributed to each reception terminal, by using the contents key.

When the distribution preventing unit 117 is preventing a data distribution to a certain reception terminal, the distribution data generating unit 121 does not generate an encrypted contents key for that reception terminal.

The distribution unit 122 distributes a set of the encrypted content and all the encrypted contents keys generated by the distribution data generating unit 121 to each of the reception terminals.

The update key generating unit 131 generates a pair of an update public key and an update secret key for the reception terminal 130, secretly passes the update secret key to the secret key managing unit 132, and sends the update public key to the public key managing unit 111, prior to a data distribution.

The secret key managing unit 132 secretly receives the update secret key from the update key generating unit 131, and manages the received update secret key.

The holding unit 133 holds an encrypted secret key that is generated by encrypting the distribution secret key for the reception terminal 130 by using the update public key for the reception terminal 130.

It should be noted here that digital signatures are placed on the encrypted secret keys for certification of the generator of the encrypted secret keys, where the generator is the key management center apparatus 110 in the present embodiment.

The reception unit 134 receives from the distribution station apparatus 120 a set of the encrypted content and all encrypted contents keys respectively prepared for all the reception terminals.

The secret key decrypting unit 135 restores the distribution secret key by decrypting the encrypted secret key held by the holding unit 133 by using the update secret key managed by the secret key managing unit 132.

The secret key decrypting unit 135 also judges whether or not the encrypted secret key has been generated by the authenticated key management center apparatus 110 based on the digital signature placed on the encrypted secret key. If having judged positively, the secret key decrypting unit 135 restores the distribution secret key for the reception terminal 130; and if having judged negatively, the secret key decrypting unit 135 does not restore the distribution secret key for the reception terminal 130.

The contents decrypting unit 136 restores the contents key by decrypting the encrypted contents key received by the receiving unit 134 by using the distribution secret key restored by the secret key decrypting unit 135. The contents decrypting unit 136 restores the content by decrypting the encrypted content received by the receiving unit 134 by using the generated contents key.

The secret key receiving unit 137 of each reception terminal receives an encrypted secret key from the transmission unit 114.

The secret key updating unit 138 allows the holding unit 133 to hold the encrypted secret key received by the secret key receiving unit 137.

If the holding unit 133 has already held an encrypted secret key, the secret key updating unit 138 updates the held encrypted secret key to the newly received encrypted secret key.

The secret key updating unit 138 judges whether the encrypted secret key received by the secret key receiving unit 137 has been generated by the authenticated key management center apparatus 110 based on the digital signature placed on the encrypted secret key. If having judged positively, the secret key updating unit 138 updates the distribution secret key; and if having judged negatively, the secret key updating unit 138 does not update the distribution secret key.

Operation

Figure 2:
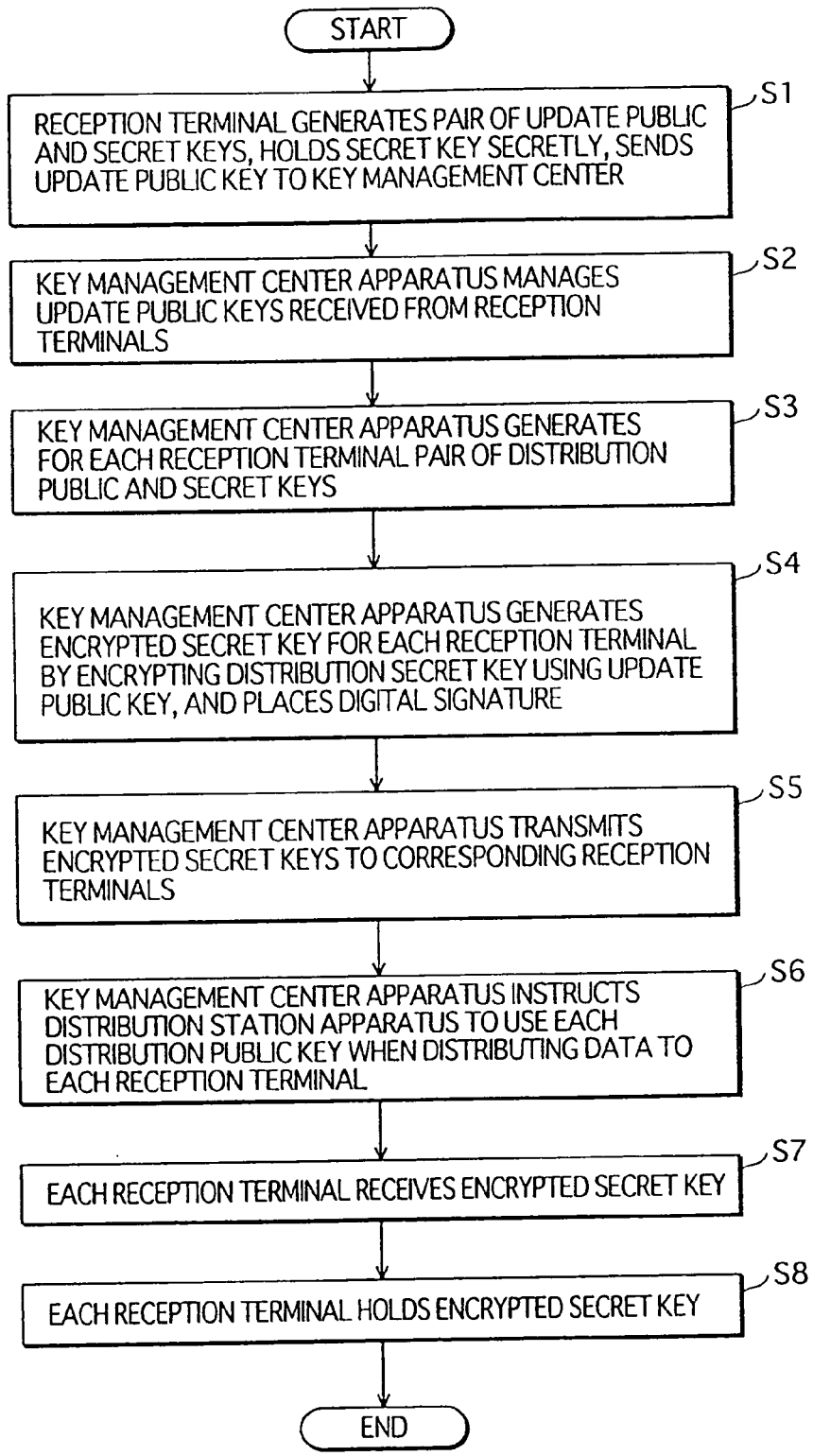
FIG. 2 is a flowchart showing the procedure for preparing a contents distribution.

FIG. 2 is a flowchart showing the procedure for preparing a contents distribution. The procedure for preparing a contents distribution will now be described with reference to FIG. 2.

(1) Each reception terminal generates a pair of an update public key and an update secret key, holds the update secret key secretly, and sends the update public key to the key management center apparatus 110 (step S1). For example, in the reception terminal 130, the update key generating unit 131 generates a pair of an update secret key IKs1 and an update public key IKp1, secretly passes the update secret key IKs1 to the secret key managing unit 132, and sends the update public key IKp1 to the public key managing unit 111 via a general communication line or the like not secretly. The secret key managing unit 132 secretly manages the received update secret key IKs1.

Similarly, the reception terminal 140 generates a pair of an update secret key IKs2 and an update public key IKp2, holds the update secret key IKs2 secretly, and sends the update public key IKp2 to the public key managing unit 111.

Similarly, the reception terminal 150 generates a pair of an update secret key IKs3 and an update public key IKp3, holds the update secret key IKs3 secretly, and sends the update public key IKp3 to the public key managing unit 111.

(2) The key management center apparatus 110 manages the update public keys respectively received from the reception terminals (step S2). For example, the public key managing unit 111 receives the update public keys IKp1, IKp2, and IKp3 from the reception terminals 130, 140, and 150, respectively, and manages the received update public keys.

(3) The key management center apparatus 110 generates for each reception terminal a pair of a distribution public key and a distribution secret key (step S3). For example, the distribution key generating unit 112 generates a pair of a distribution public key Kp1 and a distribution secret key Ks1 for the reception terminal 130, a pair of a distribution public key Kp2 and a distribution secret key Ks2 for the reception terminal 140, a pair of a distribution public key Kp3 and a distribution secret key Ks3 for the reception terminal 150.

(4) The key management center apparatus 110 generates an encrypted secret key for each reception terminal by encrypting the distribution secret key using the update public key, and places a digital signature (step S4). For example, the encrypting unit 113 generates an encrypted secret key E (IKp1,Ks1) for the reception terminal 130 by encrypting the distribution secret key Ks1 using the update public key IKp1, generates an encrypted secret key E (IKp2,Ks2) for the reception terminal 140 by encrypting the distribution secret key Ks2 using the update public key IKp2, and generates an encrypted secret key E (IKp3,Ks3) for the reception terminal 150 by encrypting the distribution secret key Ks3 using the update public key IKp3.

(5) The key management center apparatus 110 transmits the encrypted secret keys to the corresponding reception terminals (step s5). For example, the transmission unit 114 transmits the encrypted secret key E (IKp1,Ks1) to the reception terminal 130, the encrypted secret key E (IKp2, Ks2) to the reception terminal 140, and the encrypted secret key E (IKp3,Ks3) to the reception terminal 150.

(6) The key management center apparatus 110 instructs the distribution station apparatus 120 to use, when distributing data to each reception terminal, the distribution public keys for each reception terminal (step S6). For example, the key management center apparatus 110 instructs the distribution data generating unit 121 of the distribution station apparatus 120 to use, when distributing data to each reception terminal, the distribution public keys Kp1, Kp2, and Kp3.

(7) Each reception terminal receives an encrypted secret key (step S7). For example, the secret key receiving unit 137 of the reception terminal 130 receives the encrypted secret key E (IKp1,Ks1).

Similarly, the reception terminal 140 receives the encrypted secret key E (IKp2,Ks2).

Similarly, the reception terminal 150 receives the encrypted secret key E (IKp3,Ks3).

Each reception terminal holds the received encrypted secret key (step S8). For example, in the reception terminal 130, the secret key updating unit 138 allows the holding unit 133 to hold the encrypted secret key E (IKp1,Ks1) received by the secret key receiving unit 137.

Similarly, the reception terminal 140 holds the encrypted secret key E (IKp2,Ks2).

Similarly, the reception terminal 150 holds the encrypted secret key E (IKp3,Ks3).

Figure 3:
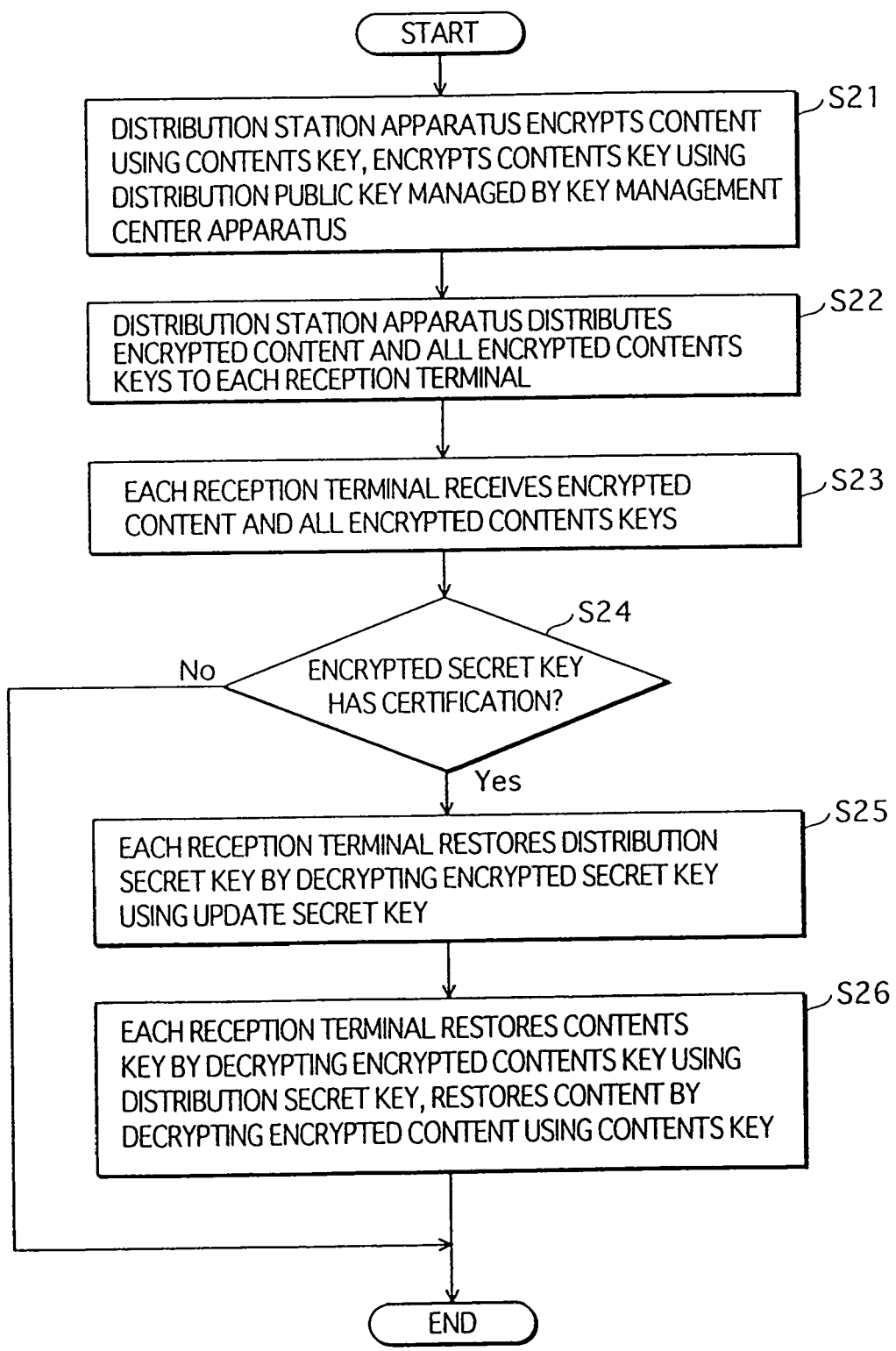
FIG. 3 is flowchart showing a contents distribution procedure.

FIG. 3 is flowchart showing a contents distribution procedure.

The contents distribution procedure will now be described with reference to FIG. 3.

(1) The distribution station apparatus 120 generates an encrypted contents key for each reception terminal by encrypting a contents key by using the distribution public key, and generates an encrypted content by encrypting a content to be distributed to each reception terminal, by using the contents key (step S21). For example, the distribution data generating unit 121 generates an encrypted content C by encrypting a content M to be distributed, by using a contents key K. The distribution data generating unit 121 also generates an encrypted contents key E (Kp1,K) for the reception terminal 130 by encrypting the contents key K by using the distribution public key Kp1 for the reception terminal 130, generates an encrypted contents key E (Kp2, K) for the reception terminal 140 by encrypting the contents key K by using the distribution public key Kp2 for the reception terminal 140, and generates an encrypted contents key E (Kp3,K) for the reception terminal 150 by encrypting the contents key K by using the distribution public key Kp3 for the reception terminal 150.

(2) The distribution station apparatus 120 distributes a set of the encrypted content and all encrypted contents keys to each reception terminal (step S22). For example, the distribution unit 122 distributes a set of the encrypted content C and all the encrypted contents key E (Kp1,K), E (Kp2,K), and E (Kp3,K) to each of the reception terminals 130, 140, and 150.

(3) Each reception terminal receives a set of the encrypted content and all encrypted contents keys (step S23). For example, the reception terminal 130 receives a set of the encrypted content C and all the encrypted contents key E (Kp1,K), E (Kp2,K), and E (Kp3,K).

(4) Each reception terminal judges whether or not the encrypted secret key it holds is authenticated, based on the digital signature placed on the encrypted secret key (step S24). For example, in the reception terminal 130, the secret key decrypting unit 135 judges whether or not the encrypted secret key E (IKp1,Ks1) held by the holding unit 133 is authenticated, based on the digital signature placed on the encrypted secret key E (IKp1,Ks1). If it is judged negatively, the content is not reproduced and the process ends.

(5) If it is judged positively in the step S24, the reception terminal restores a distribution secret key by decrypting the encrypted secret key by using the update secret key (step S25). For example, in the reception terminal 130, the secret key decrypting unit 135 generates a distribution secret key Ks1 by decrypting the encrypted secret key E (IKp1,Ks1) held by the holding unit 133 by using the update secret key IKs1 managed by the secret key managing unit 132.

(6) Each reception terminal restores the contents key by decrypting the received encrypted contents key by using the generated distribution secret key. The reception terminal restores the content by decrypting the received encrypted content by using the restored contents key (step S26). For example, in the reception terminal 130, the contents decrypting unit 136 restores a contents key K by decrypting the encrypted contents key E (Kp1,K) received by the receiving unit 134 by using the distribution secret key Ks1 restored by the secret key decrypting unit 135. The contents decrypting unit 136 restores the content (referred to as a content M) by decrypting the encrypted content C received by the receiving unit 134 by using the generated contents key K.

Figure 4:
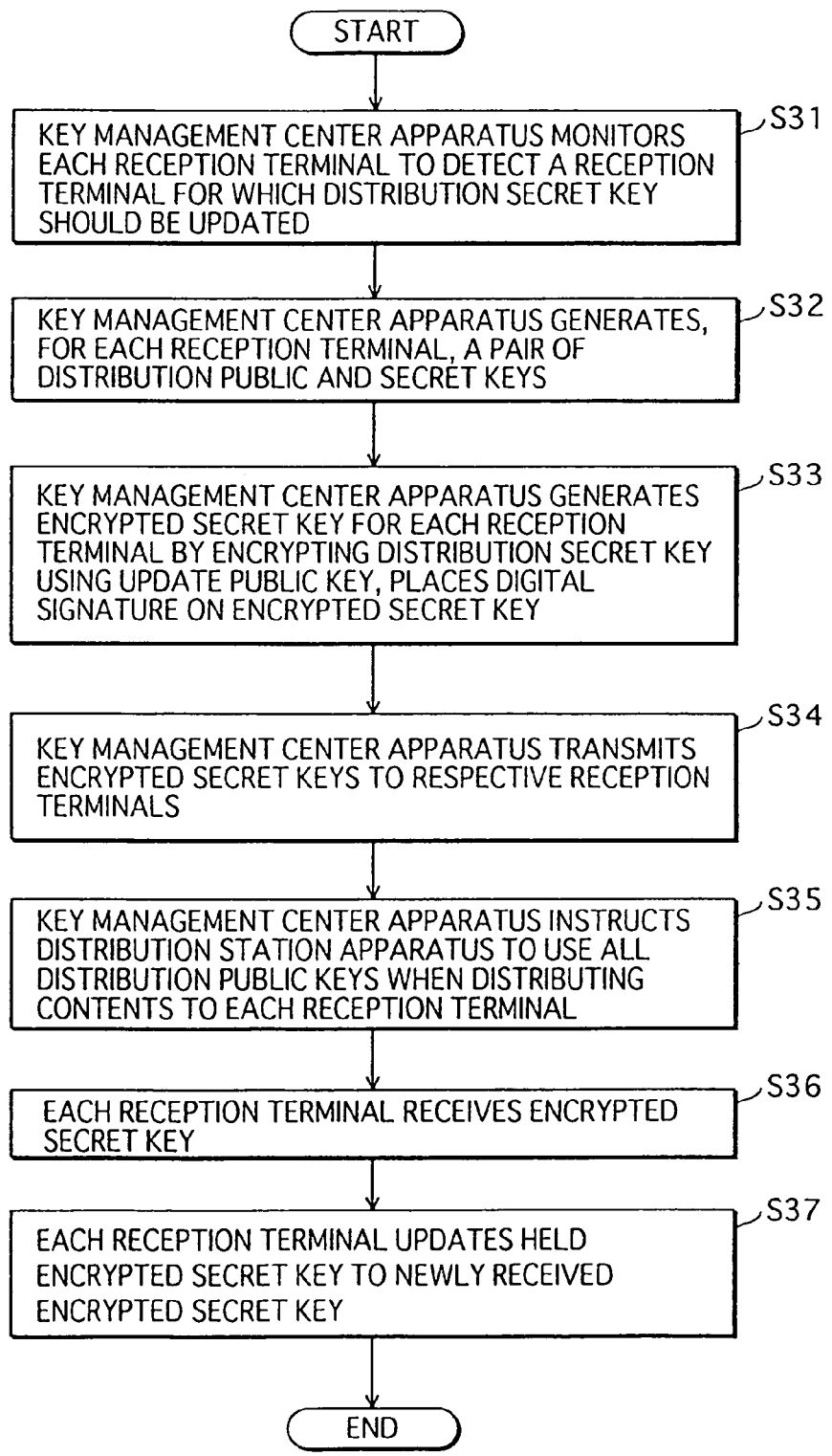
FIG. 4 is a flowchart showing the procedure of updating keys.

FIG. 4 is a flowchart showing the procedure of updating keys.

The procedure of updating keys will be described with reference to FIG. 4.

(1) The key management center apparatus 110 monitors the operation of each reception terminal to detect a reception terminal for which the distribution secret key should be updated (step S31). For example, the update determining unit 116 determines that the distribution secret keys for the reception terminals 130, 140, and 150 should be updated.

(2) The key management center apparatus 110 generates, for each reception terminal, a pair of a distribution public key and a distribution secret key (step S32). For example, the distribution key generating unit 112 generates a pair of a distribution public key Kp11 and a distribution secret key Ks11 for the reception terminal 130, a pair of a distribution public key Kp12 and a distribution secret key Ks12 for the reception terminal 140, and a pair of a distribution public key Kp13 and a distribution secret key Ks13 for the reception terminal 150.

(3) The key management center apparatus 110 generates an encrypted secret key for each reception terminal by encrypting the distribution secret key generated for each reception terminal, by using the update public key for each reception terminal, and places a digital signature on the generated encrypted secret key (step S33). For example, the encrypting unit 113 generates an encrypted secret key E (IKp1,Ks11) for the reception terminal 130 by encrypting the distribution secret key Ks11 by using the update public key IKp1, an encrypted secret key E (IKp2,Ks12) for the reception terminal 140 by encrypting the distribution secret key Ks12 by using the update public key IKp2, and an encrypted secret key E (IKp3,Ks13) for the reception terminal 150 by encrypting the distribution secret key Ks13 by using the update public key IKp3.

(4) The key management center apparatus 110 transmits the encrypted secret keys to the respective reception terminals (step S34). For example, the transmission unit 114 transmits the encrypted secret key E (IKp1,Ks11) to the reception terminal 130, the encrypted secret key E (IKp2, Ks12) to the reception terminal 140, and the encrypted secret key E (IKp3,Ks13) to the reception terminal 150.

(5) The key management center apparatus 110 instructs the distribution station apparatus 120 to use, when distributing contents to each reception terminal, all the distribution public keys for all the reception terminals (step S35). For example, the key management center apparatus 110 instructs the distribution data generating unit 121 of the distribution station apparatus 120 to use all of the distribution public keys Kp11, Kp12, and Kp13 when distributing contents to each reception terminal.

(6) Each reception terminal receives an encrypted secret key (step S36). For example, the reception terminal 130 receives the encrypted secret key E (IKp1,Ks11).

Similarly, the reception terminal 140 receives the encrypted secret key E (IKp2,Ks12).

Similarly, the reception terminal 150 receives the encrypted secret key E (IKp3,Ks13).

(7) Each reception terminal updates the held encrypted secret key to the newly received encrypted secret key (step S37). For example, in the reception terminal 130, the secret key updating unit 138 updates the encrypted secret key E (IKp1,Ks1) held by the holding unit 133 to the encrypted secret key E (IKp1,Ks11) received by the secret key receiving unit 137.

Similarly, the reception terminal 140 updates the encrypted secret key E (IKp2,Ks2) to the encrypted secret key E (IKp2,Ks12).

Similarly, the reception terminal 150 updates the encrypted secret key E (IKp3,Ks3) to the encrypted secret key E (IKp3,Ks13).

It should be noted here that the key management center apparatus and the distribution station apparatus may be incorporated in one apparatus.

As described above, the first embodiment of the present invention enables a distribution station or a key management center to take the initiative in updating a pair of a public key and a secret key for each reception terminal in a public key cryptosystem.

Second Embodiment

Summary

The second Embodiment of the present invention explains a technique for allowing a key management center to take the initiative in updating pairs of distribution keys in a DVD disc distribution system that includes a device maker, a DVD player, the key management center, an IC card, a contents maker, a disc producer, and a DVD disc.

When producing a DVD player, the device maker generates a pair of an initial secret key and an initial public key that is unique to the DVD player, has the DVD player secretly hold the initial secret key, and sends the initial public key to the key management center.

The key management center registers the received initial public key in correspondence with the DVD player with the database, generates a pair of a distribution secret key and a distribution public key for the DVD player, registers the generated distribution public key with the database so that it can be used by the disc producer in producing a DVD disc, generates an encrypted secret key by encrypting the generated distribution secret key by using the initial public key, and sends the encrypted secret key to the device maker.

The device maker records the received encrypted secret key onto an IC card, and sells the IC card together with the DVD player.

When judging that the keys should be updated after the DVD disc has been distributed, the key management center newly generates a pair of a distribution secret key and a distribution public key for the DVD player, updates the distribution public key having been registered with the database to the newly generated distribution public key, newly generates an encrypted secret key by encrypting the newly generated distribution secret key by using the initial public key having been registered with the database, records the newly generated encrypted secret key onto a new IC card, and transfers the new IC card to the DVD player.

The contents user using the DVD player receives the new IC card, replaces the former IC card with the new IC card, and uses the new IC card to play back DVD discs distributed thereafter.

As described above, in the system disclosed in the second embodiment, an IC card containing an encrypted secret key is transferred safely. This technique enables the key management center to take the initiative in updating pairs of distribution keys.

Construction

Figure 5:
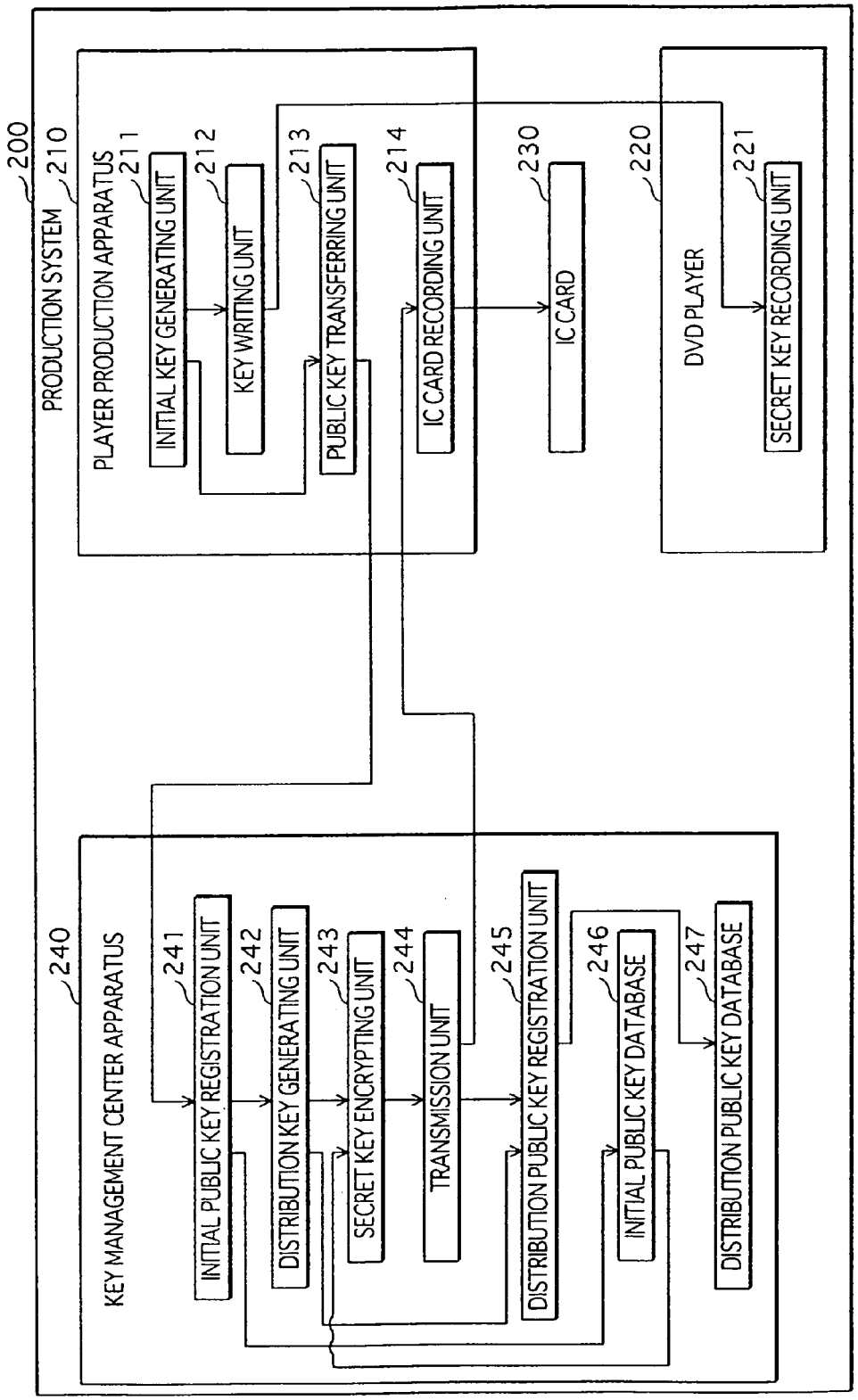
FIG. 5 shows a DVD player production system according to a second embodiment of the present invention.

FIG. 5 shows the DVD player production system according to the second embodiment of the present invention.

The production system 200 shown in FIG. 5 includes a player production apparatus 210, a DVD player 220, an IC card 230, and a key management center apparatus 240.

The player production apparatus 210 is an apparatus by which a device maker produces the DVD player 220. The player production apparatus 210 includes an initial key generating unit 211, a key writing unit 212, a public key transferring unit 213, and an IC card recording unit 214.

The DVD player 220 is an apparatus with which a contents user plays back the DVD disc. The DVD player 220 includes a secret key recording unit 221.

The IC card 230 is a semiconductor recording medium. When producing the DVD player, the production system 200 inserts the IC card 230 into the player production apparatus 210 and writes necessary data onto the IC card 230. The IC card 230 with the data written thereon is sold in combination with the DVD player 220. The contents user is required to insert the IC card 230 into a dedicated slot of the DVD player 220 when playing back a DVD disc.

The key management center apparatus 240 is an apparatus used in a key management center to manage keys for all DVD players included in a distribution system. The key management center apparatus 240 includes an initial public key registration unit 241, a distribution key generating unit 242, a secret key encrypting unit 243, a transmission unit 244, a distribution public key registration unit 245, an initial public key database 246, and a distribution public key database 247.

The initial key generating unit 211 generates a pair of an initial secret key and an initial public key for each DVD player 220.

The key writing unit 212 writes the initial secret key generated by the initial key generating unit 211 into/onto the secret key recording unit 221.

The public key transferring unit 213 transfers the initial public key generated by the initial key generating unit 211 to the initial public key registration unit 241 by means of offline.

The IC card recording unit 214 acquires an encrypted secret key from the transmission unit 244 and records the encrypted secret key onto the IC card 230.

The secret key recording unit 221 secretly holds the initial secret key written by the key writing unit 212.

The initial public key registration unit 241 receives the initial public key from the public key transferring unit 213 and registers the received initial public key with the initial public key database 246.

The distribution key generating unit 242, when a certain DVD player is produced or when keys are updated, generates a pair of a distribution secret key and a distribution public key that is unique to the certain DVD player.

The secret key encrypting unit 243 generates an encrypted secret key for the certain DVD player by encrypting the distribution secret key by using an initial public key for the certain DVD player registered with the initial public key database 246, and also places a digital signature for certification of the key management center apparatus 240 as the generator of the encrypted secret key.

The transmission unit 244, when the certain DVD player is produced, transmits the encrypted secret key generated by the secret key encrypting unit 243 to the certain DVD player.

The distribution public key registration unit 245, after the transmission unit 244 transmits the encrypted secret key to the certain DVD player, or after a new IC card generating unit 344 (which will be described later) generates and transmits (sends) a new IC card to the certain DVD player, registers the distribution public key generated by the distribution key generating unit 242 with the distribution public key database 247.

The initial public key database 246 stores, for each DVD player, initial public keys registered by the initial public key registration unit 241.

The distribution public key database 247 stores, for each DVD player, distribution public keys registered by the distribution public key registration unit 245.

Figure 6:
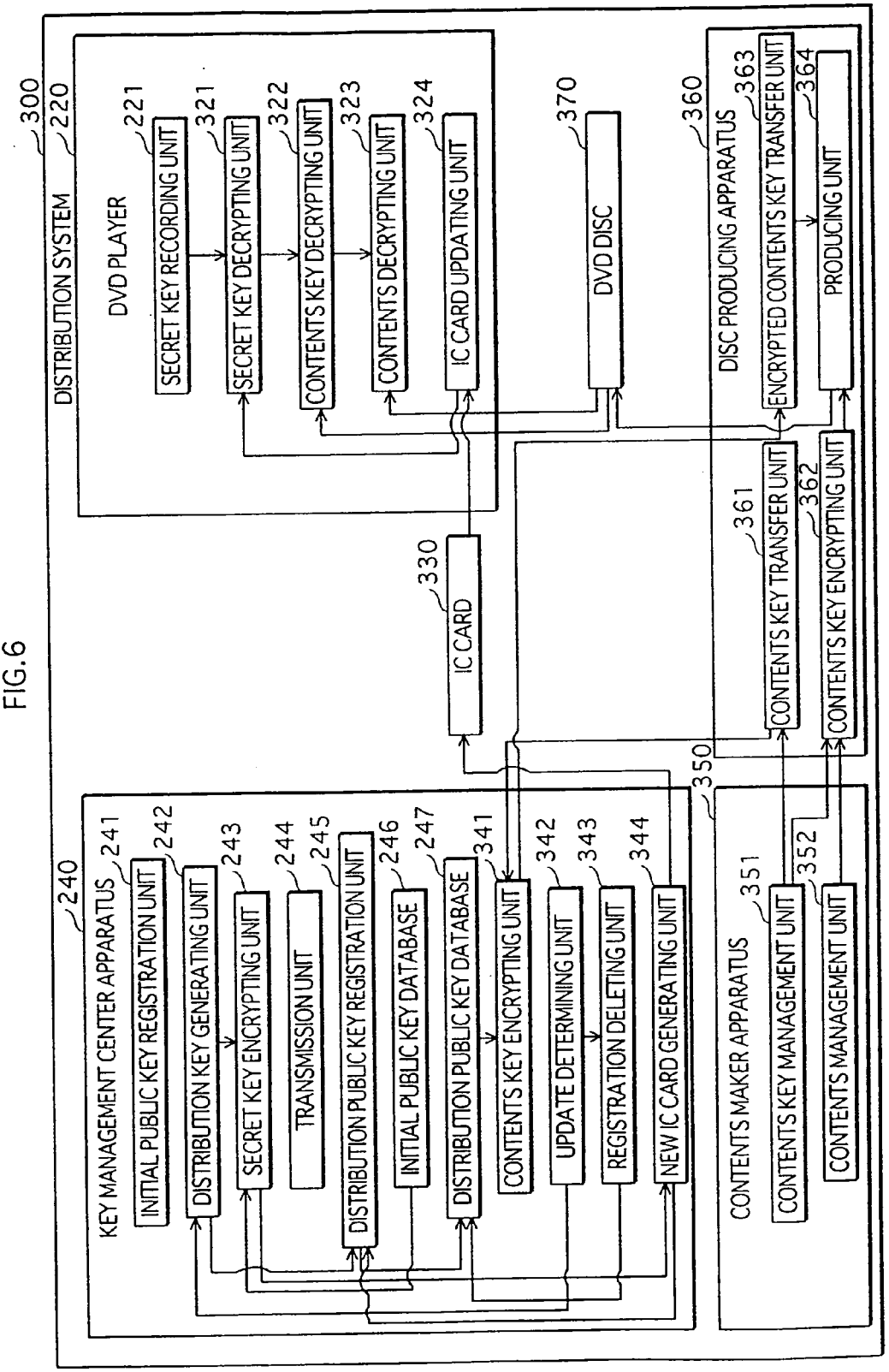
FIG. 6 shows the distribution system according to the second embodiment of the present invention.

FIG. 6 shows the distribution system according to the second embodiment of the present invention.

The distribution system 300 shown in FIG. 6 includes the DVD player 220, an IC card 330, the key management center apparatus 240, a contents maker apparatus 350, a disc producing apparatus 360, and a DVD disc 370.

The DVD player 220 further includes a secret key decrypting unit 321, a contents key decrypting unit 322, a contents decrypting unit 323, and an IC card updating unit 324, as well as the secret key recording unit 221.

The IC card 330 is a semiconductor recording medium. When updating keys, the distribution system 300 inserts the IC card 330 into a dedicated slot of the key management center apparatus 240 and writes necessary data onto the IC card 330. The contents user is required to insert the IC card into a dedicated slot of the DVD player 220 when playing back a DVD disc.

The key management center apparatus 240 further includes a contents key encrypting unit 341, an update determining unit 342, registration deleting unit 343, and a new IC card generating unit 344, as well as the initial public key registration unit 241, distribution key generating unit 242, secret key encrypting unit 243, transmission unit 244, distribution public key registration unit 245, initial public key database 246, and distribution public key database 247.

The contents maker apparatus 350 is an apparatus used by a contents maker to provide contents and contents keys. The contents maker apparatus 350 includes a contents key management unit 351 and a contents management unit 352.

The disc producing apparatus 360 is used by a disc producer to produce the DVD disc 370. The disc producing apparatus 360 includes a contents key transfer unit 361, a contents key encrypting unit 362, an encrypted contents key transfer unit 363, and a producing unit 364.

The DVD disc 370 is an optical recording medium produced by the disc producer using the disc producing apparatus 360 and is played back by the contents user using the DVD player 220.

The secret key decrypting unit 321, when the DVD disc is played back, reads the encrypted secret key from the IC card 230 or 330 inserted in the dedicated slot of the DVD player 220, and restores the distribution secret key by decrypting the encrypted secret key by using the initial secret key held by the secret key recording unit 221.

The secret key decrypting unit 321 also judges whether or not the encrypted secret key has been generated by the authenticated key management center apparatus 240 based on the digital signature placed on the encrypted secret key. If having judged positively, the secret key decrypting unit 321 restores the distribution secret key for the DVD player 220; and if having judged negatively, the secret key decrypting unit 321 does not restore the distribution secret key for the DVD player 220.

The contents key decrypting unit 322, when the DVD disc is played back, restores the contents key by decrypting the encrypted contents key for the DVD player 220 recorded on the DVD disc 370 by using the distribution secret key restored by the secret key decrypting unit 321.

The contents decrypting unit 323 restores the content by decrypting the encrypted content recorded on the DVD disc 370 by using the contents key restored by the contents key decrypting unit 322.

The IC card updating unit 324 receives the IC card 330 from the new IC card generating unit 344, and after receiving the IC card 330, inserts the IC card 330 into the dedicated slot of the DVD player 220 and prepares for the succeeding playback of DVD discs.

The contents key encrypting unit 341, when DVD discs are produced, receives from the contents key transfer unit 361 the contents keys to be used for the production of the DVD discs, generates encrypted contents keys for each DVD player by encrypting the received contents keys by using each distribution public key for all the currently effective DVD players registered with the distribution public key database 247, and sends the generated encrypted contents keys to the encrypted contents key transfer unit 363.

The update determining unit 342 monitors the operation of each DVD player to detect a DVD player which should be prevented from playing back a DVD disc or for which the distribution secret key should be updated. For example, the update determining unit 342 may determine that all distribution secret keys should be updated either when any DVD players are abnormally operating or on a regular basis.

It should be noted here that every distribution secret key that is determined to be updated by the update determining unit 342 is updated without delay by the distribution key generating unit 242, secret key encrypting unit 243, and distribution public key registration unit 245 after the new IC card generating unit 344 transmits a new IC card to a corresponding DVD player.

The registration deleting unit 343 deletes a distribution public key from the distribution public key database 247 after a corresponding DVD player is detected by the update determining unit 342 to be a DVD player which is to be prevented from playing back a DVD disc.

The new IC card generating unit 344, when keys for a certain DVD player are updated, generates a new IC card 330 by recording the encrypted secret key for the certain DVD player generated by the secret key encrypting unit 243 onto a new IC card, and transmits the generated new IC card 330 to the corresponding DVD player.

The contents key management unit 351 manages contents keys, and provides the disc producing apparatus 360 with currently effective contents keys.

The contents management unit 352 manages contents, and provides the disc producing apparatus 360 with contents to be distributed.

The contents key transfer unit 361 receives contents keys from the contents key management unit 351 and sends the received contents keys to the contents key encrypting unit 341.

The contents encrypting unit 362 receives a content from the contents management unit 352, receives a contents key from the contents key transfer unit 361, generates an encrypted content by encrypting the received content by using the received contents key, and sends the generated encrypted content to the producing unit 364.

The encrypted contents key transfer unit 363 receives encrypted contents keys for each DVD player from the contents key encrypting unit 341, and sends the received encrypted contents keys to the producing unit 364.

The producing unit 364 produces a DVD disc 370 by recording onto an optical disc the encrypted content received from the contents encrypting unit 362 and the encrypted contents key for each DVD player received from the encrypted contents key transfer unit 363.

Operation

Figure 7:
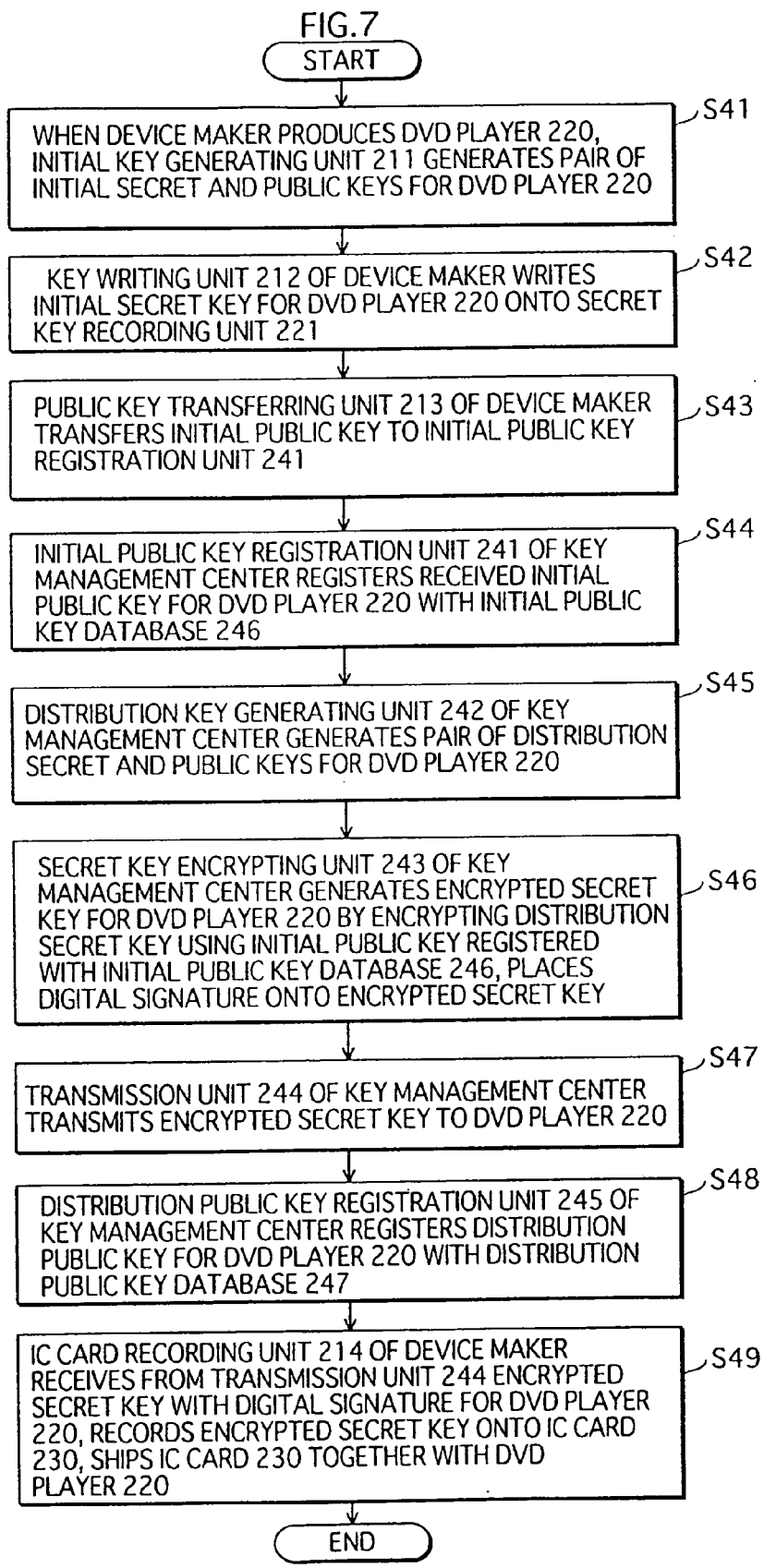
FIG. 7 is a flowchart showing the procedure of producing a DVD player.

FIG. 7 is a flowchart showing the procedure of producing a DVD player.

The procedure of producing a DVD player will now be described with reference to FIG. 7.

(1) When the device maker produces a certain DVD player 220, the initial key generating unit 211 generates a pair of an initial secret key and an initial public key for the certain DVD player 220 (step S41).

(2) The key writing unit 212 of the device maker writes the initial secret key for the certain DVD player 220 into/onto the secret key recording unit 221 (step S42).

(3) The public key transferring unit 213 of the device maker transfers the initial public key to the initial public key registration unit 241 of the key management center (step S43).

(4) The initial public key registration unit 241 of the key management center registers the received initial public key for the certain DVD player 220 with the initial public key database 246 (step S44).

(5) The distribution key generating unit 242 of the key management center generates a pair of a distribution secret key and a distribution public key for the certain DVD player 220 (step S45).

(6) The secret key encrypting unit 243 of the key management center generates an encrypted secret key for the certain DVD player by encrypting the generated distribution secret key by using an initial public key for the certain DVD player 220 registered with the initial public key database 246, and also places a digital signature onto the encrypted secret key (step S46).

(7) The transmission unit 244 of the key management center transmits the generated encrypted secret key to the certain DVD player 220 (step S47).

(8) The distribution public key registration unit 245 of the key management center registers the distribution public key for the certain DVD player 220 with the distribution public key database 247 (step S48).

The IC card recording unit 214 of the device maker receives from the transmission unit 244 the encrypted secret key for the certain DVD player 220 on which a digital signature is placed, records the encrypted secret key onto an IC card 230, and ships the IC card 230 together with the certain DVD player 220 (step S49).

Figure 8:
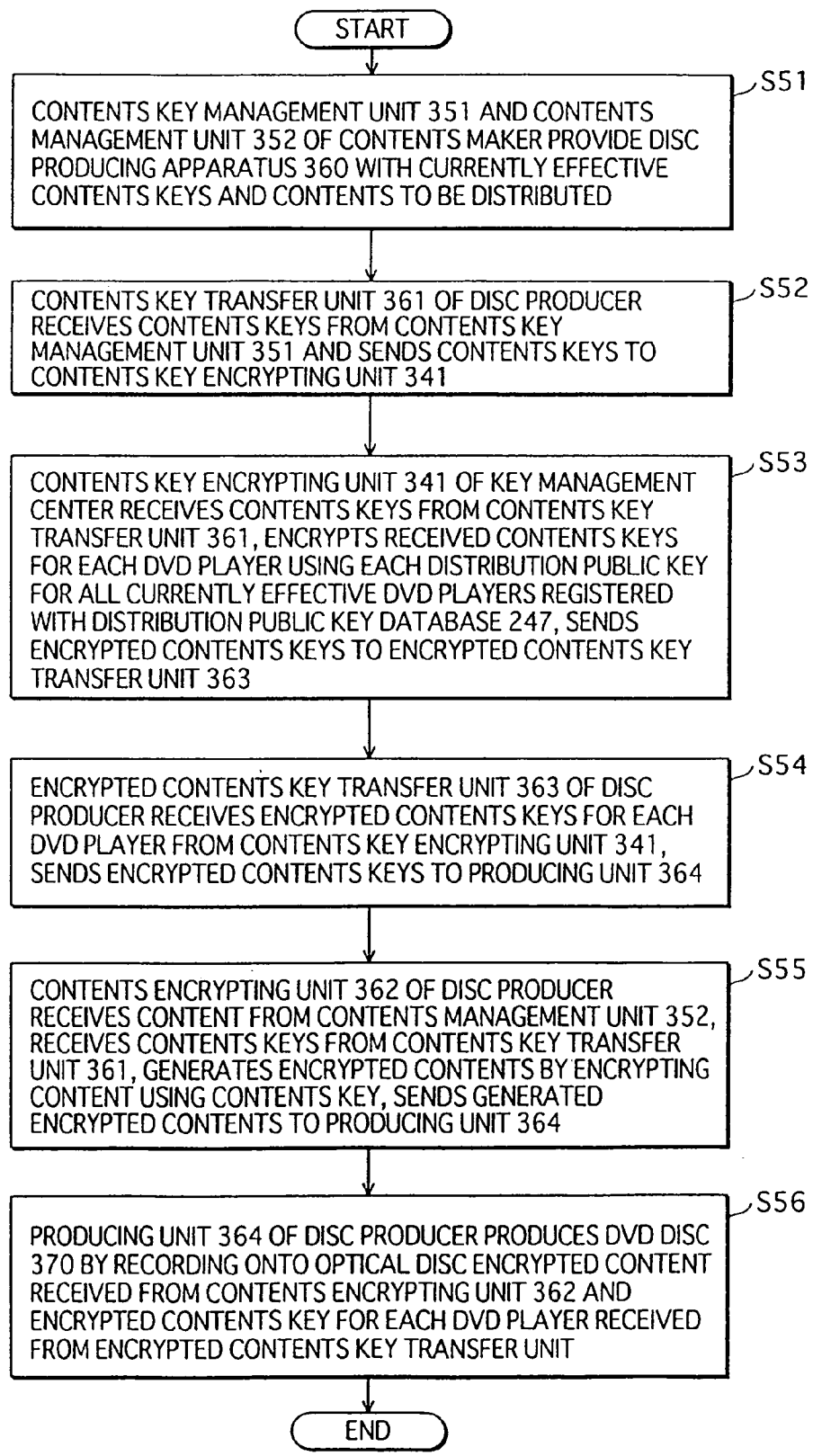
FIG. 8 is a flowchart showing the procedure of producing a DVD disc.

FIG. 8 is a flowchart showing the procedure of producing a DVD disc.

The procedure of producing a DVD disc will now be described with reference to FIG. 8.

(1) The contents key management unit 351 and the contents management unit 352 of the contents maker provide the disc producing apparatus 360 with currently effective contents keys and contents to be distributed, respectively (step S51).

(2) The contents key transfer unit 361 of the disc producer receives contents keys from the contents key management unit 351 and sends the received contents keys to the contents key encrypting unit 341 (step S52).

(3) The contents key encrypting unit 341 of the key management center receives the contents keys from the contents key transfer unit 361, generates encrypted contents keys for each DVD player by encrypting the received contents keys by using each distribution public key for all the currently effective DVD players registered with the distribution public key database 247, and sends the generated encrypted contents keys to the encrypted contents key transfer unit 363 (step S53).

(4) The encrypted contents key transfer unit 363 of the disc producer receives the encrypted contents keys for each DVD player from the contents key encrypting unit 341, and sends the received encrypted contents keys to the producing unit 364 (step S54).

(5) The contents encrypting unit 362 of the disc producer receives a content from the contents management unit 352, receives the contents keys from the contents key transfer unit 361, generates encrypted contents by encrypting the received content by using the received contents key, and sends the generated encrypted contents to the producing unit 364 (step S55).

The producing unit 364 of the disc producer produces a DVD disc 370 by recording onto an optical disc the encrypted content received from the contents encrypting unit 362 and the encrypted contents key for each DVD player received from the encrypted contents key transfer unit 363 (step S56).

Figure 9:
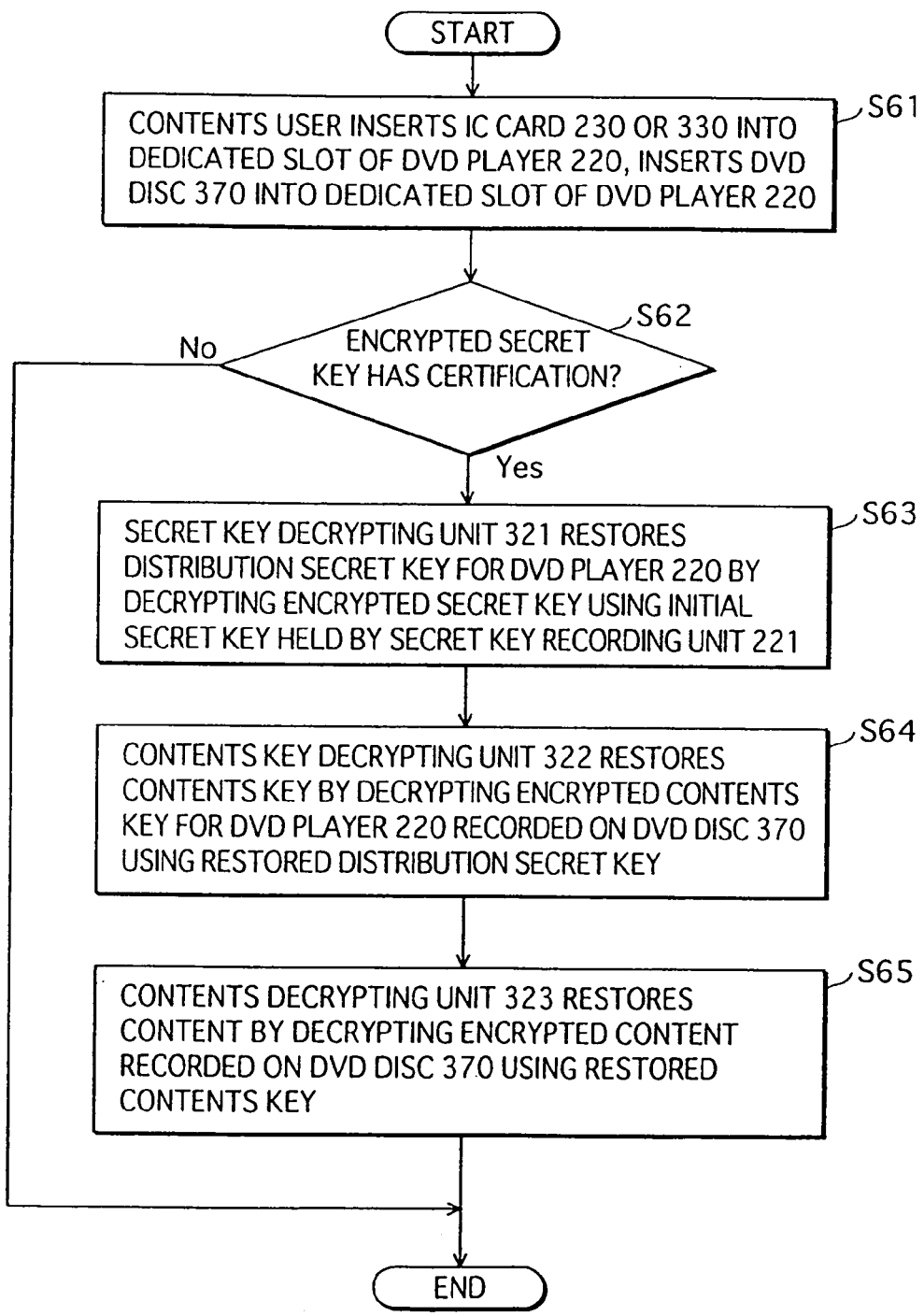
FIG. 9 is a flowchart showing the procedure of playing back a DVD disc.

FIG. 9 is a flowchart showing the procedure of playing back a DVD disc.

The procedure of playing back a DVD disc will now be described with reference to FIG. 9.

(1) The contents user inserts the IC card 230 or 330 into a dedicated slot of the DVD player 220, and inserts the DVD disc 370 into a dedicated slot of the DVD player 220 (step S61).

(2) The secret key decrypting unit 321 of the DVD player 220 reads the encrypted secret key from the IC card 230 or 330 inserted in the dedicated slot of the DVD player, and judges whether or not the encrypted secret key has a certification based on the digital signature placed on the encrypted secret key (step S62). If it is judged negatively in step S62, the process ends without playing back the DVD disc.

(3) If it is judged positively in step S62, the secret key decrypting unit 321 restores the distribution secret key for the DVD player 220 by decrypting the encrypted secret key by using the initial secret key held by the secret key recording unit 221 (step S63).

(4) The contents key decrypting unit 322 restores the contents key by decrypting the encrypted contents key for the DVD player 220 recorded on the DVD disc 370 by using the distribution secret key restored by the secret key decrypting unit 321 (step S64).

(5) The contents decrypting unit 323 restores the content by decrypting the encrypted content recorded on the DVD disc 370 by using the contents key restored by the contents key decrypting unit 322 (step S65).

Figure 10:
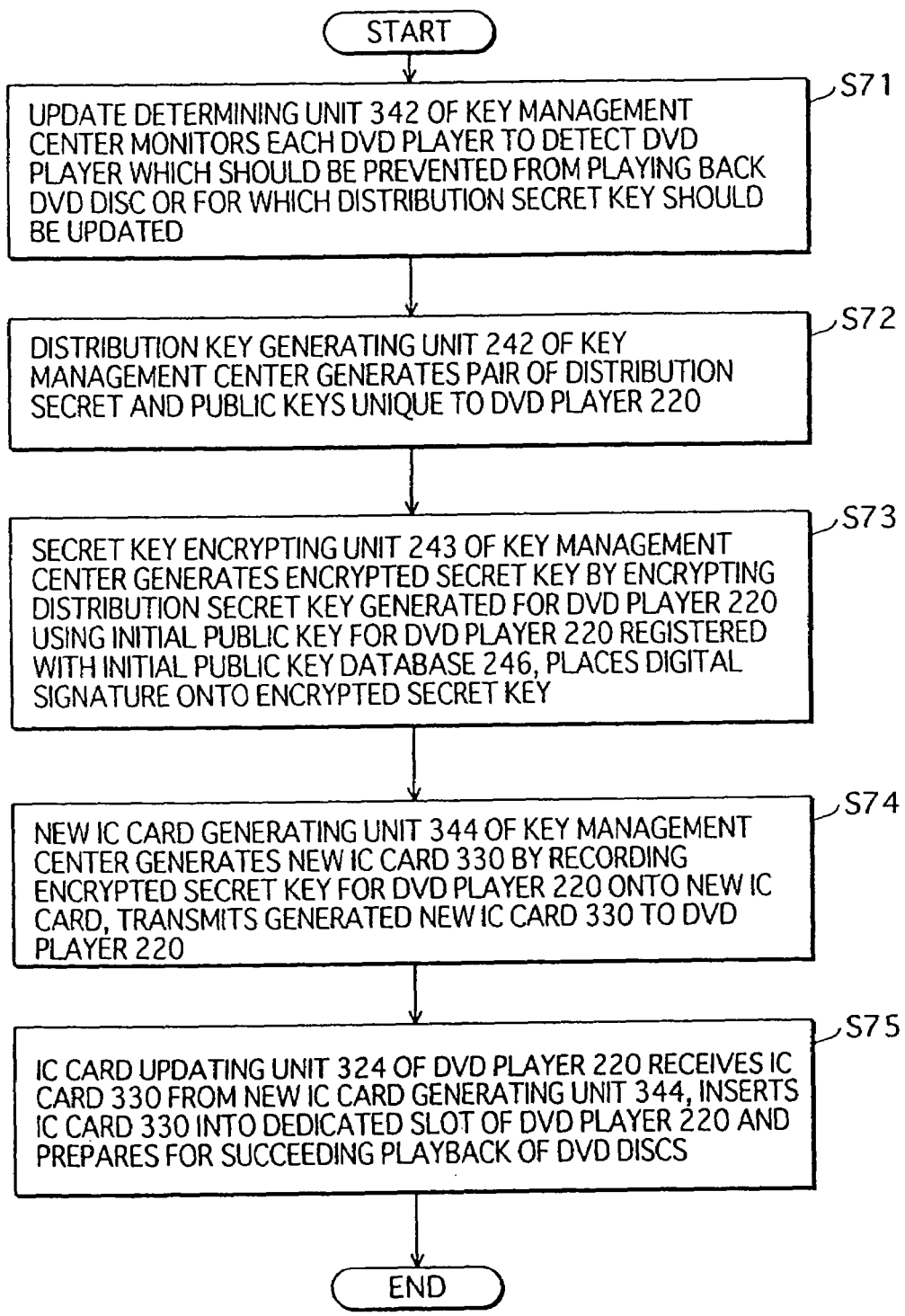
FIG. 10 is a flowchart showing the procedure of updating an IC card.

FIG. 10 is a flowchart showing the procedure of updating an IC card.

The procedure of updating an IC card will now be described with reference to FIG. 10.

(1) The update determining unit 342 of the key management center monitors the operation of each DVD player to detect a DVD player which should be prevented from playing back a DVD disc or for which the distribution secret key should be updated. In this example, it is presumed that the update determining unit 342 determines that the distribution secret key for the DVD player 220 should be updated (step S71).

(2) The distribution key generating unit 242 of the key management center generates a pair of a distribution secret key and a distribution public key that is unique to the DVD player 220 (step S72).

(3) The secret key encrypting unit 243 of the key management center generates an encrypted secret key by encrypting the distribution secret key generated for the DVD player 220 by using an initial public key for the DVD player 220 registered with the initial public key database 246, and also places a digital signature onto the encrypted secret key (step S73).

(4) The new IC card generating unit 344 of the key management center generates a new IC card 330 by recording the encrypted secret key for the DVD player 220 onto a new IC card, and transmits the generated new IC card 330 to the DVD player 220 (step S74).

(5) The IC card updating unit 324 of the DVD player 220 receives the IC card 330 from the new IC card generating unit 344, and after receiving the IC card 330, inserts the IC card 330 into the dedicated slot of the DVD player 220 and prepares for the succeeding playback of DVD discs (step S75).

It should be noted here that the key management center apparatus and the disc producing apparatus may be incorporated in one apparatus.

As described above, the second embodiment of the present invention enables a key management center to take the initiative in updating a pair of a public key and a secret key.

Although it is supposed in the first and second embodiments that the ElGamal cryptosystem is used as the public key cryptosystem, any other public key cryptosystems may be used instead.

Although it is supposed in the first and second embodiments that the digital signatures used to authenticate the encrypted secret keys provided from a key management center conform to the ElGamal cryptosystem, the digital signatures may conform to any other cryptosystems in so far as they can certify the authenticity of the encrypted secret keys.

In the first and second embodiments, the encrypted secret keys, encrypted contents keys, encrypted contents or the like may be transferred via communication paths, or removable and movable recording mediums such as floppy discs, CD, MO, DVD, and memory cards, or any other means that can transfer encrypted contents.

In the first and second embodiments, a plurality of key management centers may be provided. Each key management center may separately manage the encrypted keys, and each reception terminal or each DVD player may manage the encrypted keys for each key management center.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method, for use in a data distribution system having a key management center, a distribution station, and a plurality of reception terminals, for updating a plurality of pairs of a distribution public key and a distribution secret key conforming to a public key cryptosystem and being prepared for the plurality of reception terminals, respectively and uniquely, the distribution public key being used to encrypt data to be distributed to a corresponding reception terminal, and the distribution secret key being used by a corresponding reception terminal to decrypt encrypted data distributed thereto, said method comprising:

an update secret key acquiring operation in which each reception terminal acquires a corresponding update secret key prior to a data distribution, wherein a plurality of update secret keys acquired by the plurality of reception terminals are different from each other and are respectively unique to the plurality of reception terminals;

an update public key acquiring operation in which the key management center acquires a plurality of update public keys that make pairs with the update secret keys, respectively, prior to the data distribution, wherein the plurality of update public keys acquired by the key management center are different from each other and are respectively unique to the plurality of reception terminals;

a key generating operation in which the key management center generates a plurality of new pairs of a distribution public key and a distribution secret key for the plurality of reception terminals, respectively, wherein the plurality of distribution public keys generated by the key management center are different from each other and are respectively unique to the plurality of reception terminals, and the plurality of distribution secret keys generated by the key management center are different from each other and are respectively unique to the plurality of reception terminals;

an encrypting operation in which the key management center generates encrypted secret keys for the plurality of reception terminals by encrypting the new distribution secret keys by using the update public keys for the plurality of reception terminals, respectively;

a sending operation in which the key management center sends the encrypted secret keys to the corresponding reception terminals all at once;

a distribution public key updating operation in which, after said sending operation, the key management center updates the distribution public keys having been used so far by the distribution station in data distributions to the new distribution public keys;

a reception operation in which each reception terminal receives a corresponding encrypted secret key;

a distribution secret key updating operation in which each reception terminal restores the corresponding new distribution secret key by decrypting the encrypted secret key, by using the corresponding update secret key, and updates the distribution secret key having been used so far to the restored new distribution secret key;

a contents key encryption operation in which the distribution station generates encrypted contents keys corresponding respectively to each of the plurality of reception terminals by encrypting a contents key conforming to a secret key cryptosystem, by using the distribution public keys corresponding respectively to each of the plurality of reception terminals, and generates encrypted content by encrypting a content by using the contents key;

a contents distribution operation in which the distribution station distributes (a) all the generated encrypted contents keys, and (b) the encrypted content to each of the plurality of reception terminals; and a contents restoring operation in which each reception terminal restores the contents key by decrypting a corresponding encrypted contents key among the distributed encrypted contents keys by using the corresponding distribution secret key, and restores the content by decrypting the encrypted content by using the restored contents key.

2. The key updating method of claim 1, wherein:

in said encrypting operation, the key management center further places a digital signature on each encrypted secret key as a certification of the encrypted secret key;

before said distribution secret key updating operation, each reception terminal checks the digital signature placed on the corresponding encrypted secret key and judges, based on the digital signature, whether or not the corresponding encrypted secret key has the certification of the encrypted secret key;

each reception terminal updates to the new distribution secret key if the corresponding encrypted key is judged to have the certification; and each reception terminal does not update to the new distribution secret key if the corresponding encrypted key is judged to not have the certification.

3. The key updating method of claim 1, further comprising:

a terminal detecting operation in which the distribution station physically detects a reception terminal for which data distribution should be stopped; and a distribution preventing operation in which, when a reception terminal for which data distribution should be stopped is detected in said terminal detecting operation, the distribution station prevents data distribution to the detected reception terminal.

4. The key updating method of claim 1, further comprising a terminal detecting operation in which the distribution station physically detects a reception terminal for which a distribution secret key should be updated, wherein:

in said key generating operation, the key management center generates a new pair of a distribution public key and a distribution secret key for the reception terminal detected in said terminal detecting operation;

in said encrypting operation, the key management center generates an encrypted secret key for the detected reception terminal by encrypting the new distribution secret key generated for the detected reception terminal, by using the update public key unique to the detected reception terminal;

in said sending operation, the key management center transmits the encrypted secret key for the detected reception terminal to the detected reception terminal;

in said distribution public key updating operation, after said sending operation, the key management center updates the distribution public key having been used so far by the distribution station in data distributions to the detected reception terminal, to the new distribution public key; and in said distribution secret key updating operation, the detected reception terminal restores the new distribution secret key by decrypting the encrypted secret key by using the update secret key, and updates the distribution secret key having been used so far to the restored new distribution secret key.

5. The key updating method of claim 1, wherein:

each reception terminal has a portable IC card on which an encrypted secret key unique to each reception terminal is recorded, and each reception terminal restores a distribution secret key by decrypting the encrypted secret key recorded on the IC card, and decrypts distributed encrypted data by using the restored distribution secret key;

in said sending operation, the key management center records the encrypted secret key generated in said encrypting operation onto a new IC card, and sends the new IC card to each reception terminal for use;

each reception terminal receives the new IC card in said reception operation; and in said distribution secret key updating operation, each reception terminal updates to the new distribution secret key by replacing the IC card having been used so far with the new IC card.

6. A reception terminal for receiving distributed encrypted content, said reception terminal having a distribution secret key unique to said reception terminal, said reception terminal comprising:

an update secret key acquiring unit for acquiring an update secret key prior to a data distribution, the update secret key acquired by said update secret key acquiring unit being unique to said reception terminal;

a holding unit for holding an encrypted secret key which is generated by encrypting the distribution secret key unique to said reception terminal, by using an update public key that is unique to said reception terminal and that makes a pair with the update secret key;

a distribution secret key restoring unit for restoring the distribution secret key unique to said reception terminal by decrypting the encrypted secret key held by said holding unit, by using the update secret key acquired by said update secret key acquiring unit;

a reception unit for receiving (a) an encrypted contents key generated by encrypting a contents key by using a distribution public key unique to said reception terminal, and (b) an encrypted content generated by encrypting a content by using the contents key; and a data restoring unit for restoring the contents key by decrypting the encrypted contents key by using the distribution secret key unique to said reception terminal, and for restoring the content by decrypting the encrypted content by using the restored contents key.

7. The reception terminal of claim 6, further comprising:

a new key receiving unit for receiving a new encrypted secret key from a key management center, the new encrypted secret key being generated by the key management center by encrypting a distribution secret key by using the update public key, the distribution secret key making a pair with a distribution public key, the pair being generated by the key management center and conforming to a public key cryptosystem; and a secret key updating unit for updating the encrypted secret key held by said holding unit to the new encrypted secret key.

8. The reception terminal of claim 7, wherein:
the new encrypted secret key received by said new key receiving unit has a digital signature as a certification of the new encrypted secret key; and
after said secret key updating unit updates to the new encrypted secret key, said distribution secret key restoring unit is operable to
check the digital signature placed on the new encrypted secret key and judge whether or not the new encrypted secret key has the certification of the new encrypted secret key,
restore another distribution secret key by decrypting the new encrypted secret key if the new encrypted secret key is judged to have the certification, and
not restore another distribution secret key if the new encrypted secret key is not judged to have the certification.

9. The reception terminal of claim 7, wherein:
said holding unit is an IC card;
said new key receiving unit is operable to receive a new IC card on which the new encrypted secret key is recorded; and
said secret key updating unit is operable to update to the new encrypted secret key by replacing the IC card having been used so far with the new IC card.

10. A key management apparatus comprising:
an update public key acquiring unit for acquiring, prior to a data distribution, a plurality of update public keys that are different from each other and are respectively unique to a plurality of reception terminals;
a key generating unit for generating a plurality of pairs of a distribution public key and a distribution secret key for the plurality of terminals, respectively, wherein the plurality of distribution public keys generated by said key generating unit are different from each other and are respectively unique to the plurality of reception terminals, and the plurality of distribution secret keys generated by said key generating unit are different from each other and are respectively unique to the plurality of reception terminals such that each pair of the distribution public key and distribution secret key generated for each of the plurality of reception terminals is respectively unique to the plurality of reception terminals;
an encrypting unit for generating encrypted secret keys for the plurality of reception terminals by encrypting the distribution secret keys by using the update public keys for the plurality of reception terminals, respectively;
a sending unit for sending the encrypted secret keys to the corresponding reception terminals all at once;
a distribution public key updating unit for updating, after said sending unit sends the encrypted secret keys to the corresponding reception terminals, the distribution public keys having been used so far to the new distribution public keys for the respective reception terminals;
a distribution data generating unit for generating a plurality of encrypted contents keys for the plurality of reception terminals, respectively, by encrypting a contents key by using the distribution public keys for the plurality of reception terminals, and for generating encrypted content by encrypting a content by using the contents key; and
a distribution unit for distributing (a) all the generated encrypted contents keys, and (b) the encrypted content to each of the plurality of reception terminals.

11. The key management apparatus of claim 10, wherein said encrypting unit is further operable to place a digital signature on the encrypted secret key as a certification of the encrypted secret key.

12. The key management apparatus of claim 10, further comprising:
a terminal detecting unit for detecting a reception terminal for which data distribution should be stopped; and
a distribution preventing unit for, when a reception terminal for which a data distribution should be stopped is detected by said terminal detecting unit, preventing the data distribution to the detected reception terminal.

13. The key management apparatus of claim 10, further comprising a terminal detecting unit for detecting a reception terminal for which a distribution secret key should be updated, wherein:
said key generating unit is operable to generate a new pair of a distribution public key and a distribution secret key for the reception terminal detected by said terminal detecting unit;
said encrypting unit is operable to generate an encrypted secret key for the detected reception terminal by encrypting the new distribution secret key generated for the detected reception terminal, by using the update public key unique to the detected reception terminal;
said sending unit is operable to send the encrypted secret key for the detected reception terminal to the detected reception terminal;
said distribution public key updating unit, after said sending unit sends the encrypted secret key to the detected reception terminal, is operable to update the distribution public key having been used so far to the new distribution public key, for the detected reception terminal.

14. The key management apparatus of claim 10, wherein:
each reception terminal has an IC card on which an encrypted secret key unique to the reception terminal is recorded, and each reception terminal is operable to restore a distribution secret key by decrypting the encrypted secret key recorded on the IC card, and decrypt distributed encrypted data by using the restored distribution secret key; and
said sending unit is operable to record the encrypted secret key generated by said encrypting unit onto a new IC card, and send the new IC card to each reception terminal for use.

15. The key updating method of claim 1, wherein each of the reception terminals is a DVD player, and the distribution station records all the generated encrypted contents keys and a corresponding encrypted content onto an optical disc.

16. The reception terminal of claim 6, further configured to serve as a DVD player, wherein said reception unit is operable to receive the encrypted contents key and the encrypted content recorded on an optical disc.

17. The key management apparatus of claim 10, wherein:
each of the reception terminals is a DVD player; and
said distribution unit is operable to record all the generated encrypted contents keys and the encrypted content onto an optical disc.

* * * * *

UNITED STATES PATENT AND TRADEMARK OFFICE
CERTIFICATE OF CORRECTION

PATENT NO. : 7,206,412 B2
APPLICATION NO. : 10/119766
DATED : April 17, 2007
INVENTOR(S) : Kaoru Yokota et al.

It is certified that error appears in the above-identified patent and that said Letters Patent is hereby corrected as shown below:

ON THE TITLE PAGE

Item (56), Other Publications, under articles, line 7, please change "Intenrational Symposium on Guimaraes" to --International Symposium on Guimaraes--.

Signed and Sealed this

Seventh Day of August, 2007

JON W. DUDAS
*Director of the United States Patent and Trademark Office*